United States Patent
Schmidt

(10) Patent No.: US 11,895,181 B2
(45) Date of Patent: Feb. 6, 2024

(54) POWER OPTIMIZATION OF MICROSERVER LOADS

(71) Applicant: SCHNEIDER ELECTRIC IT CORPORATION, Foxboro, MA (US)

(72) Inventor: Michael Kenneth Schmidt, St. Charles, MO (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 25 days.

(21) Appl. No.: 17/111,985

(22) Filed: Dec. 4, 2020

(65) Prior Publication Data

US 2022/0182440 A1 Jun. 9, 2022

(51) Int. Cl.
*H04L 67/1008* (2022.01)
*H04L 43/16* (2022.01)

(52) U.S. Cl.
CPC .......... *H04L 67/1008* (2013.01); *H04L 43/16* (2013.01)

(58) Field of Classification Search
CPC .............. H04L 67/1008; H04L 43/16; G06F 9/5088; G06F 9/5094; G06F 2009/4557; G06F 9/505; G06F 9/5083
USPC ........................................................ 709/226
See application file for complete search history.

(56) References Cited

U.S. PATENT DOCUMENTS

| | | | |
|---|---|---|---|
| 6,003,030 A | 12/1999 | Kenner et al. | |
| 8,051,162 B2 | 11/2011 | Arlitt et al. | |
| 8,255,516 B1 | 8/2012 | Zhang et al. | |
| 8,606,894 B1 | 12/2013 | Fremont et al. | |
| 9,047,074 B2 * | 6/2015 | Pfeifer | G06F 1/266 |
| 9,557,792 B1 * | 1/2017 | Potlapally | G06F 1/3206 |
| 9,792,321 B2 | 10/2017 | Buehne et al. | |
| 9,874,924 B1 * | 1/2018 | Li | G06F 9/5088 |
| 9,910,618 B1 * | 3/2018 | Curley | G06F 11/2071 |
| 2005/0257248 A1 | 11/2005 | Kegel et al. | |
| 2006/0173875 A1 | 8/2006 | Stefaniak | |
| 2006/0179171 A1 | 8/2006 | Stefaniak et al. | |
| 2008/0066073 A1 * | 3/2008 | Sen | H04L 67/1019 718/105 |

(Continued)

FOREIGN PATENT DOCUMENTS

JP 6346377 B2 6/2018

*Primary Examiner* — Madhu Woolcock
(74) *Attorney, Agent, or Firm* — Lando & Anastasi, LLP

(57) ABSTRACT

Examples of the disclosure include a microserver system comprising a plurality of microservers, a common hardware bus interconnecting the microservers, each microserver of the plurality of microservers being configured to execute one or more applications, and a controller coupled to the plurality of microservers, the controller being configured to determine, based on application-load data associated with the one or more applications, a first application load of a first set of one or more applications executed by a first microserver of the plurality of microservers and a second application load of a second set of one or more applications executed by a second microserver of the plurality of microservers, determine that a combination of the first application load and the second application load is below a maximum-application-load threshold of the second microserver, and migrate the first set of one or more applications from the first microserver to the second microserver.

21 Claims, 3 Drawing Sheets

(56) References Cited

U.S. PATENT DOCUMENTS

| | | | |
|---|---|---|---|
| 2010/0030877 A1* | 2/2010 | Yanagisawa | G06F 9/5077 709/221 |
| 2010/0318827 A1* | 12/2010 | Shah | G06F 9/5094 713/324 |
| 2011/0099403 A1* | 4/2011 | Miyata | G06F 9/5088 718/1 |
| 2011/0173329 A1* | 7/2011 | Zhang | G06F 9/5094 709/226 |
| 2012/0137289 A1* | 5/2012 | Nolterieke | G06F 9/5094 718/1 |
| 2014/0201758 A1* | 7/2014 | Albornoz | G06F 9/5083 718/105 |
| 2015/0019195 A1 | 1/2015 | Davis | |
| 2015/0319231 A1* | 11/2015 | Naouri | H04L 67/1001 709/204 |
| 2016/0021177 A1* | 1/2016 | Kobayashi | G06F 9/5088 709/226 |
| 2016/0094483 A1 | 3/2016 | Johnston et al. | |
| 2017/0257275 A1* | 9/2017 | Atyam | H04L 41/0663 |
| 2017/0286146 A1* | 10/2017 | Voigt | G06F 9/455 |
| 2017/0315838 A1* | 11/2017 | Nidugala | H04L 43/0817 |
| 2017/0364375 A1* | 12/2017 | Ku | G06F 9/44505 |
| 2018/0341507 A1* | 11/2018 | Inbaraj | G06F 9/452 |
| 2019/0004826 A1* | 1/2019 | Ryan | H04L 61/3025 |
| 2019/0235922 A1* | 8/2019 | Lovanna | G06F 9/4856 |
| 2020/0004582 A1* | 1/2020 | Fornash | G06F 9/4856 |

* cited by examiner

POWER OPTIMIZATION OF MICROSERVER LOADS

BACKGROUND

1. Field of the Disclosure

At least one example in accordance with the present disclosure relates generally to providing technological improvements to the technical field of load distribution optimization, such as in relation to microserver loads.

2. Discussion of Related Art

Computing devices such as microservers may execute applications on behalf of client devices, which may include performing operations or functions on behalf of client devices. Microservers may be implemented with higher densities and with lower power requirements than other, general-purpose servers. For example, a group (or "cluster") of microservers may be interconnected through a single common hardware bus, through which application data corresponding to applications executed by the interconnected microservers may be exchanged.

SUMMARY

According to at least one aspect of the present disclosure, a microserver system is provided comprising a plurality of microservers, a common hardware bus interconnecting the plurality of microservers, wherein each microserver of the plurality of microservers is configured to execute one or more applications, and a controller coupled to the plurality of microservers, the controller being configured to determine, based on application-load data associated with the one or more applications, a first application load of a first set of one or more applications executed by a first microserver of the plurality of microservers and a second application load of a second set of one or more applications executed by a second microserver of the plurality of microservers, determine that a combination of the first application load and the second application load is below a maximum-application-load threshold of the second microserver, and migrate the first set of one or more applications from the first microserver to the second microserver.

In at least one example, migrating the first set of one or more applications from the first microserver to the second microserver includes instantiating the first set of one or more applications on the second microserver, and deactivating the first set of one or more applications on the first microserver. In various examples, the controller is further configured to control the first microserver to enter a low-power mode subsequent to migrating the first set of one or more applications from the first microserver to the second microserver. In some examples, the first application load is a smallest application load of the plurality of microservers, and wherein the controller is further configured to identify a third application load of a third set of one or more applications executed by a third microserver of the plurality of microservers, the third application load being a next-smallest application load after the first application load, and identify a fourth application load of a fourth set of one or more applications executed by a fourth microserver of the plurality of microservers, the fourth application load being a largest application load of the plurality of microservers.

In at least one example, the controller is further configured to determine that a combination of the third application load and the fourth application load is above a maximum-application-load threshold of the fourth microserver, identify a fifth application load of a fifth set of one or more applications executed by a fifth microserver of the plurality of microservers, the fifth application load being a next-largest application load of the plurality of microservers after the fourth application load, determine that a combination of the third application load and the fifth application load is below a maximum-application-load threshold of the fifth microserver, and migrate the third set of one or more applications from the third microserver to the fifth microserver. In various examples, the controller is further configured to determine that a combination of the third application load and the fourth application load is below a maximum-application-load threshold of the fourth microserver, and migrate the third set of one or more applications from the third microserver to the fourth microserver.

In some examples, the fourth microserver is the second microserver and the fourth set of one or more applications includes the first set of one or more applications and the second set of one or more applications. In various examples, the controller is further configured to repeatedly determine whether any combination of application loads from two or more microservers of the plurality of microservers is below a maximum-application-load threshold of any of the two or more microservers, and to migrate applications to the microserver for which the combination of application loads is below the maximum-application-load threshold of the microserver. In at least one example, the common hardware bus is a backplane. In various examples, determining the first application load of the first microserver is based on at least one of historical application-load data for the first set of one or more applications stored by the controller or current application-load data determined by the controller for the first set of one or more applications.

According to at least one aspect of the disclosure, a non-transitory computer-readable medium storing thereon sequences of computer-executable instructions for managing a plurality of microservers is provided, the sequences of computer-executable instructions including instructions that instruct at least one processor to determine, based on application-load data associated with one or more applications executed by the plurality of microservers, a first application load of a first set of one or more applications executed by a first microserver of the plurality of microservers and a second application load of a second set of one or more applications executed by a second microserver of the plurality of microservers, determine that a combination of the first application load and the second application load is below a maximum-application-load threshold of the second microserver, and migrate the first set of one or more applications from the first microserver to the second microserver.

In various examples, migrating the first set of one or more applications from the first microserver to the second microserver includes instantiating the first set of one or more applications on the second microserver, and deactivating the first set of one or more applications on the first microserver. In some examples, the instructions further instruct the at least one processor to control the first microserver to enter a low-power mode subsequent to migrating the first set of one or more applications from the first microserver to the second microserver. In at least one example, the first application load is a smallest application load of the plurality of microservers, and the instructions further instruct the at least one processor to identify a third application load of a third set of one or more applications executed by a third microserver of the plurality of microservers, the third application load being a next-smallest application load after the first application load, and identify a fourth application load of a fourth set of one or more applications executed by a fourth microserver of the plurality of microservers, the fourth application load being a largest application load of the plurality of microservers.

In at least one example, the instructions further instruct the at least one processor to determine that a combination of the third application load and the fourth application load is above a maximum-application-load threshold of the fourth microserver, identify a fifth application load of a fifth set of one or more applications executed by a fifth microserver of the plurality of microservers, the fifth application load being a next-largest application load of the plurality of microservers after the fourth application load, determine that a combination of the third application load and the fifth application load is below a maximum-application-load threshold of the fifth microserver, and migrate the third set of one or more applications from the third microserver to the fifth microserver. In various examples, the instructions further instruct the at least one processor to determine that a combination of the third application load and the fourth application load is below a maximum-application-load threshold of the fourth microserver, and migrate the third set of one or more applications from the third microserver to the fourth microserver.

In some examples, the fourth microserver is the second microserver and the fourth set of one or more applications includes the first set of one or more applications and the second set of one or more applications. In at least one example, the instructions further instruct the at least one processor to repeatedly determine whether any combination of application loads from two or more microservers of the plurality of microservers is below a maximum-application-load threshold of any of the two or more microservers, and to migrate applications to the microserver for which the combination of application loads is below the maximum-application-load threshold of the microserver. In various examples, determining the first application load includes at least one of accessing historical application-load data for the first set of one or more applications or determining current application-load data for the first set of one or more applications.

According to at least one aspect of the disclosure, a method of managing a plurality of microservers is provided, the method comprising determining, based on application-load data associated with one or more applications executed by the plurality of microservers, a first application load of a first set of one or more applications executed by a first microserver of the plurality of microservers and a second application load of a second set of one or more applications executed by a second microserver of the plurality of microservers, determining that a combination of the first application load and the second application load is below a maximum-application-load threshold of the second microserver, and migrating the first set of one or more applications from the first microserver to the second microserver.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
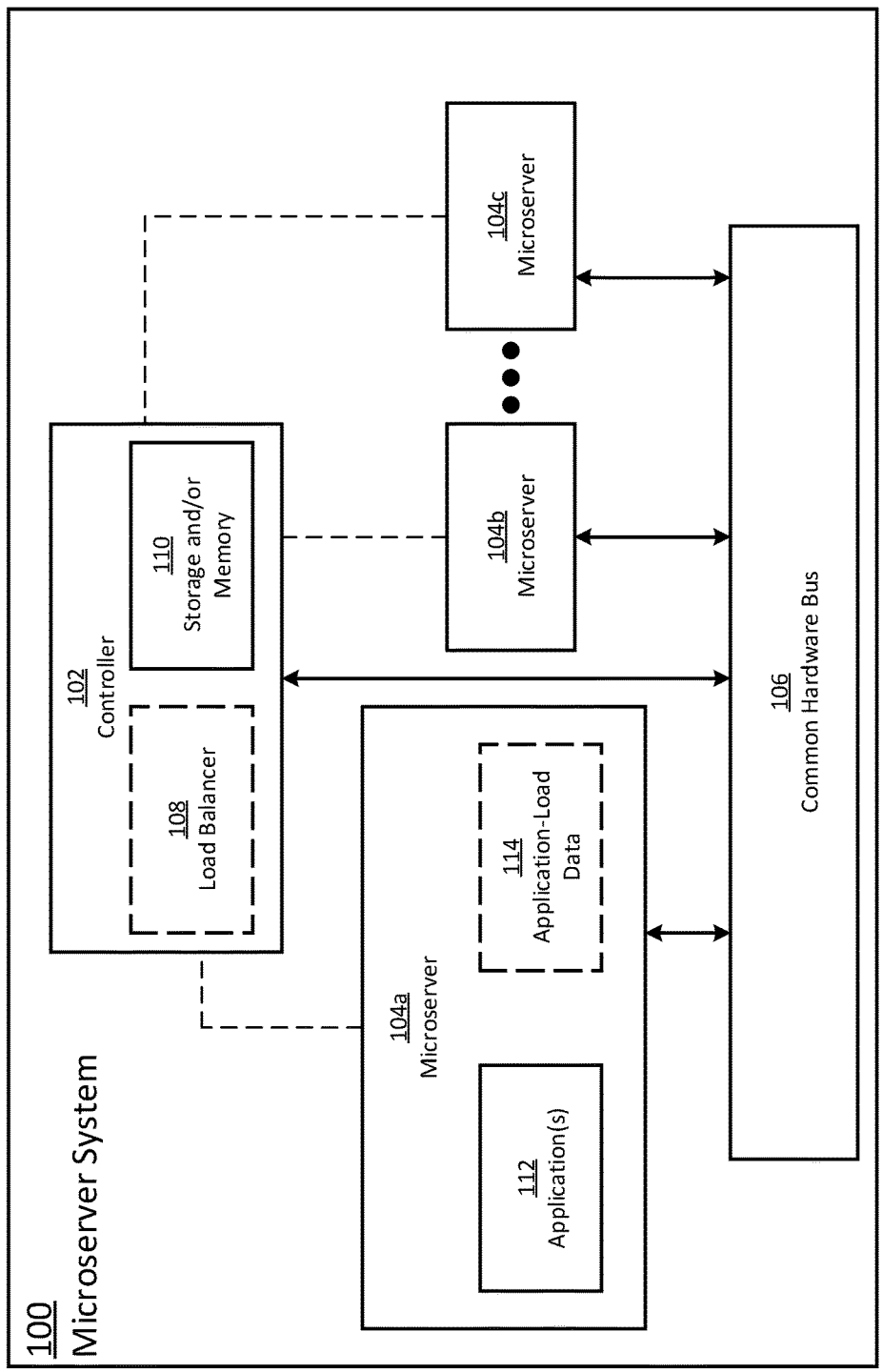
FIG. 1 illustrates a block diagram of a microserver system according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, microservers may be configured to execute applications on behalf of other devices, referred to as client devices. Microservers may be distinguished from servers inasmuch as microservers may consume less power and are typically provided in higher densities. A group, or "cluster," of microservers may be interconnected through a common hardware bus. A hardware bus is a hardware medium through which communications, such as application data and other communications, may be exchanged. Power may also be provided to devices connected to the hardware bus, including microservers. The hardware bus may include several groups of electrical connectors, each being capable of being coupled to a device, such as a microserver, to connect the device to the hardware bus. A group of micro servers interconnected through a common hardware bus may communicate by sending and receiving information via the electrical connectors to the common hardware bus. For example, one example of a common hardware bus is a backplane configured to be connected to multiple microservers.

In some examples, a group of microservers and a common hardware bus through which the microservers are interconnected may be referred to as, or included in, a microserver system. The microserver system may further include other devices, such as a central controller, or simply a "controller." The controller may assign applications to microservers within the microserver system, and exchange information with the microservers to facilitate or enable execution of the applications. A microserver executing one or more applications may output application data to the common hardware bus. The application may include executing one or more functions, operations, or calculations on or with input data to produce the application data. Upon executing the one or more applications, the microservers may send the resultant application data to the controller, to other microservers, to the client devices, or to other devices. For example, the application data may be an output to a device via the common hardware bus.

Microservers may include several modes of operation, including an active mode of operation in which the microserver is actively executing an application, an idle mode of operation in which the microserver is standing by to execute an application, and a lower-power mode of operation, also referred to as a low-power mode of operation, in which some or all of the functionality of the microserver is suspended, disabled, or powered-down. While a microserver in the idle mode of operation may be able to quickly respond to (for example, execute) an assigned application, the microserver may still be undesirably consuming electrical power while awaiting input data. Accordingly, if the microserver is not going to be in the active mode of operation for an extended period of time, it may be more advantageous for the microserver to be in the lower-power mode of operation, rather than the idle mode of operation, such that power can be conserved.

Accordingly, microserver systems may suffer from reduced efficiency if microservers in the system are maintained in an idle state for extended periods of time. This is a technical problem. Examples provided herein provide a technical solution to this technical problem by enabling applications to be consolidated on an optimized (for example, minimized) number of microservers. An application load of each microserver may be determined based on current application-load data and/or stored historical application-load data previously obtained by an integrated load balancer. Based on the determined application loads, applications may be consolidated to a minimum number of microservers. Microservers that are not executing applications may be controlled to enter a lower-power mode such that power efficiency is increased for the microserver system. In various examples, an integrated load balancer responsible for controlling which microservers execute which applications may have direct privileged access to current and historical application-load data. The integrated load balancer may therefore quickly and efficiently determine an optimal application distribution and itself execute any necessary application migrations, rather than instructing another device to perform the desired migrations, which may undesirably delay the migration process. Accordingly, examples discussed herein provide technological improvements to operating certain device systems, such as microserver systems, by improving power efficiency.

FIG. 1 illustrates a block diagram of a microserver system 100 according to an example. The microserver system 100 includes a controller 102, microservers 104 including a first microserver 104a, a second microserver 104b, and a third microserver 104c, and a common hardware bus 106. In some examples, the microserver system 100 may be implemented in a physical enclosure. For example, the microserver system 100 may be implemented in a physical enclosure disposed in a data center.

The controller 102 executes a load balancer 108 and includes storage and/or memory 110. The first microserver 104a is configured to execute one or more applications 112 and is configured to generate application-load data 114. The microservers 104b, 104c may be substantially similar to the first microserver 104a, and in some examples, the microservers 104 may include fewer than or more than three microservers.

The controller 102 is coupled to the common hardware bus 106 and is communicatively coupled to the microservers 104, which may be via the common hardware bus 106 or may be via another communication medium. The microservers 104 are coupled to the common hardware bus 106 and to the controller 102. The common hardware bus 106 is coupled to the controller 102 and to the microservers 104. For example, the common hardware bus 106 may include a backplane. In some examples, the common hardware bus 106 may be connected to one or more additional components, such as a power input configured to distribute electrical power to the microservers 104 via the common hardware bus 106, and/or a communication interface configured to enable communication with external devices. For example, the common hardware bus 106 may include a wired or wireless communication interface to enable communication between the controller 102 and one or more client devices to facilitate executing applications on behalf of the one or more client devices.

The microservers 104 may include multiple modes of operation. Using the first microserver 104a as an example, in an active mode of operation, the first microserver 104a is actively executing the one or more applications 112. Executing the one or more applications 112 may include performing one or more operations based on input data received from one or more devices connected to the common hardware bus 106 to generate output application data (for example, an output of the application when executed with respect to the input data), and sending the application data to the controller 102, other microservers of the microservers 104, client devices, or other devices, such as other devices connected to the common hardware bus 106. In some examples, input data may be provided to the controller 102, and the controller 102 may route the input data to an appropriate one of the microservers 104. An appropriate one of the microservers 104 may be a microserver that is executing applications for which the input data is an input. Accordingly, in some examples, the controller 102 may operate as a multiplexer configured to distribute incoming data to an appropriate one of the microservers 104. In other examples, the controller 102 may not route input data to an appropriate one of the microservers 104. The controller 102 may assign an application to one of the microservers 104, and the microserver may communicate directly with a client to obtain the input data.

In an idle mode of operation, the first microserver 104a is not actively executing the one or more applications 112. However, certain functionality of the first microserver 104a is maintained in a powered state such that the first microserver 104a is able to quickly transition to the active mode of operation. While an amount of power consumed in the idle mode of operation may be less than an amount of power consumed in the active mode of operation, the power consumed in the idle mode of operation may nonetheless be non-negligible. In a lower-power mode of operation, which may include several different modes of operation including an off mode of operation, the first microserver 104*a* is not actively executing the one or more applications 112 and is consuming less power than in either the active or idle mode of operation. For example, the first microserver 104*a* may partially or entirely reduce power to certain functionality relative to the active and/or idle mode of operation. Each of the microservers 104 may include substantially similar modes of operation as the first microserver 104*a* in the examples provided above.

An application load on the microserver system 100 may vary with time. The application load, which may be expressed in terms of one or more of central processing unit (CPU) usage, memory, storage, network bandwidth, disk utilization, disk bandwidth, electrical power consumption, computational load (for example, expressed in computational cycles) and so forth of the microservers 104 in the microserver system 100, may be higher as more applications are executed during peak business hours and lower as fewer applications are executed during non-peak business hours. Data associated with the application load is referred to herein as "application-load data." Each of the microservers 104 may have a respective application-load threshold which should not normally be exceeded. Where the total application load placed on the microserver system 100 exceeds the application-load threshold of any individual one of the microservers 104, several of the microservers 104 may need to be in the active mode of operation to satisfy the application load. For example, a large number of the microservers 104 may need to be in the active mode of operation during peak business hours to satisfy the higher application load placed on the microserver system 100, and a smaller number of the microservers 104 may need to be in the active mode of operation during non-peak business hours when the application load is reduced.

It may be advantageous to determine a smallest number of microservers that can satisfy an application-load demand on the microserver system 100 at various times. At certain points in time, the application load on the microserver system 100 may be capable of being satisfied by fewer than all of the microservers 104. While it may be possible to control all of the microservers 104 to be in an active mode of operation to execute applications, it may be more beneficial to consolidate the applications amongst as few of the microservers 104 as possible without exceeding a respective application-load threshold of any of the microservers 104. The remaining microservers not executing applications may be placed in a lower-power mode of operation such that the power efficiency of the microserver system 100 is increased. Power efficiency may be increased for each additional microserver placed in the lower-power mode. Accordingly, it may be advantageous to identify a minimum number of the microservers 104 that can satisfy an application load, and control a remaining number of the microservers 104 to enter the lower-power mode.

The controller 102 may execute the load balancer 108 to determine the minimum number of the microservers 104 that can satisfy an application load on the microserver system 100. The load balancer 108 may be capable of requesting or directly obtaining application-load data, such as the application-load data 114, from the microservers 104. For example, the controller 102 may include, or be coupled to, one or more sensors configured to directly measure some or all of the application-load data 114, such as electrical power consumed by the first microserver 104*a*. Alternatively or additionally, the load balancer 108 may request or otherwise obtain the application-load data 114 from the first microserver 104*a*. In some examples, the application-load data 114 may include or be associated with the application data output by the first microserver 104*a* as a result of executing the one or more applications 112, where the application data may be measured by the controller 102 or components connected thereto, or may be requested from the first microserver 104*a*, or may be obtained through other techniques in other examples. The controller 102 may store application-load data in the storage and/or memory 110. The stored application-load data may be correlated to a specific set of one or more applications such that the controller 102 can, in the future, predict an application load of the set of one or more applications based on the stored application-load data. For example, the controller 102 may be able to predict a present and future application load on the first microserver 104*a* based on the one or more applications 112 that the controller 102 assigns to the first microserver 104*a*, because the controller 102 can access historical application-load data correlating applications to previously stored application-load data. In some examples, the controller 102 may use a combination of the historical application-load data and current application-load data directly measured (for example, in real-time) by one or more sensors.

The load balancer 108 may be further configured to control the microservers 104 to instantiate, migrate, and/or deactivate one or more applications. The load balancer 108 is therefore capable of efficiently managing the microserver system 100 by having direct access to application data and stored application-load data, which can be used to determine which of the microservers 104 are to execute applications. The load balancer 108 can then control the microservers 104 to instantiate, migrate, and/or deactivate applications as appropriate. If fewer than all of the microservers 104 are executing applications, then the controller 102 can control any of the microservers 104 not executing applications to enter a lower-power mode, thereby increasing power efficiency of the microserver system 100.

Figure 2:
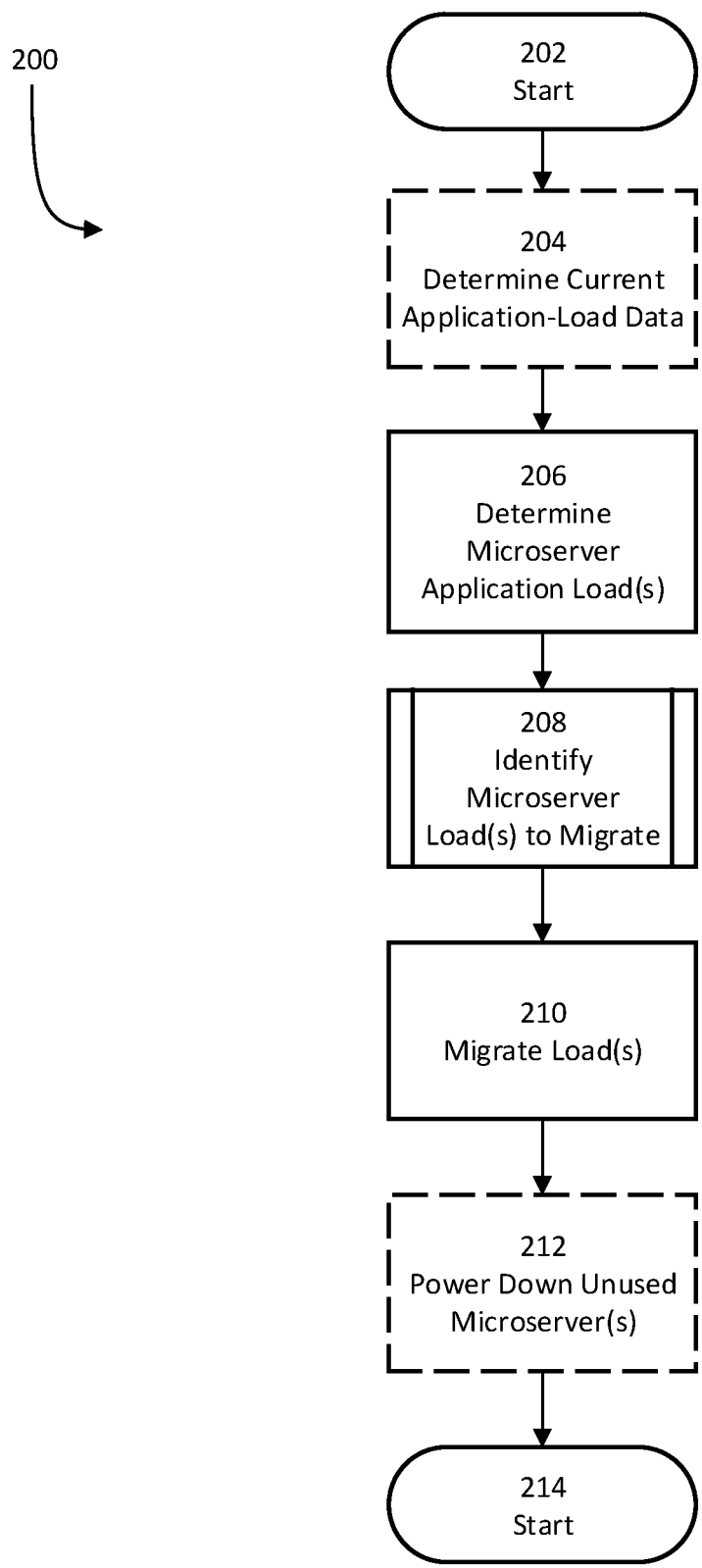
FIG. 2 illustrates a process of optimizing a microserver load distribution according to an example.

FIG. 2 illustrates a process 200 of controlling the microserver system 100 according to an example. The process 200 may be executed continuously, periodically, or in response to an occurrence of an event. For example, the process 200 may be executed responsive to the controller 102 being powered on.

At act 202, the process 200 begins.

At optional act 204, the controller 102 may determine current application-load data of the microservers 104. Application-load data may be associated with an application load managed by one or more of the microservers 104, and may be expressed in terms of one or more parameters including CPU usage, memory, storage, network bandwidth, disk utilization, disk bandwidth, electrical power consumption, computational load (for example, expressed in computational cycles) and so forth. In some examples, the controller 102 may poll the microservers 104 or other devices for current application-load data, such as electrical power consumption, application data throughput, bandwidth information, or other information and/or data associated with an application load being presently managed by the one or more of the microservers 104, which the controller 102 may store in the storage and/or memory 110. In other examples, the controller 102 may measure the application-load data 114 (for example, in connection with one or more sensors)

in addition to, or in lieu of, polling the microservers 104 for the application-load data 114. In still other examples, act 204 is not executed, and the process 200 continues from act 202 to act 206.

At act 206, the controller 102 determines an application load on each of the microservers 104 based on application-load data. Determining the application load may be based on current application-load data optionally determined at act 204 and/or historical application-load data. As discussed above, the controller 102 may store historical application-load data in the storage and/or memory 110 indicating an application load exerted on the microservers 104 when executing certain applications. The controller 102 may therefore predict an application load exerted on the microservers 104 based on the applications that the controller 102 assigns to the microservers 104. In other examples, such as examples in which act 204 is executed, the controller 102 may use the application-load data 114 determined directly at act 204 to determine an application load of the microservers 104 in addition to, or in lieu of, predicting the application load based on the historical application-load data.

At act 208, the controller 102 identifies one or more microserver application loads to migrate. For example, the controller 102 may determine that all of the applications being executed by a first one of the microservers 104 can be migrated to one or more second microservers of the microservers 104, which would enable the controller 102 to power the first microserver down into a lower-power mode of operation. An example of act 208 is provided below with respect to FIG. 3, which results in identifying an optimized distribution of application loads across the microservers 104. In some examples, certain application loads may not be migrated regardless of an application load. A microserver or microserver application may be tagged as being exempt from migrations. For example, a microserver or microserver application may be tagged as a critical microserver or microserver application that is not to undergo migration regardless of an application load.

At act 210, application loads are migrated between the microservers 104. As discussed above, the load balancer 108 may be responsible for migrating, instantiating, and deactivating applications across the microservers 104, and subsequently routing application data from the controller 102 to the microservers 104 as appropriate. Accordingly, at act 210 the load balancer 108 migrates application loads from one or more originating microservers of the microservers 104 to one or more destination microservers of the microservers 104. Migration may include the load balancer 108 instantiating an application on a destination microserver, routing application data from the controller 102 to the destination microserver, and deactivating the application on the originating microserver. For example, the application may be deactivated on the originating microserver subsequent to instantiating the application on the destination microserver and routing the application data from the controller 102 to the destination microserver. As discussed above, act 210 may include migrating application loads from several originating microservers to several destination microservers, which may be performed simultaneously, sequentially, or a combination thereof, by the load balancer 108.

At optional act 212, unused microservers may be powered down into a lower-power mode of operation. Unused microservers may include microservers that are not actively executing any applications, including originating microservers for which applications were deactivated at act 210. In examples in which optional act 212 is executed, the controller 102 controls the unused microservers to enter a lower-power mode of operation at act 212, which may include disabling or suspending some or all of the functionality of the microservers such that a power consumption of the unused microservers is reduced. Accordingly, the controller 102 reduces a power consumption of the microserver system 100 by consolidating application loads across the microservers 104 and reducing a power consumption of unused microservers of the microservers 104. In other examples, act 212 may not be executed, and the process 200 may continue from act 210 directly to act 214.

At act 214, the process 200 ends.

Figure 3:
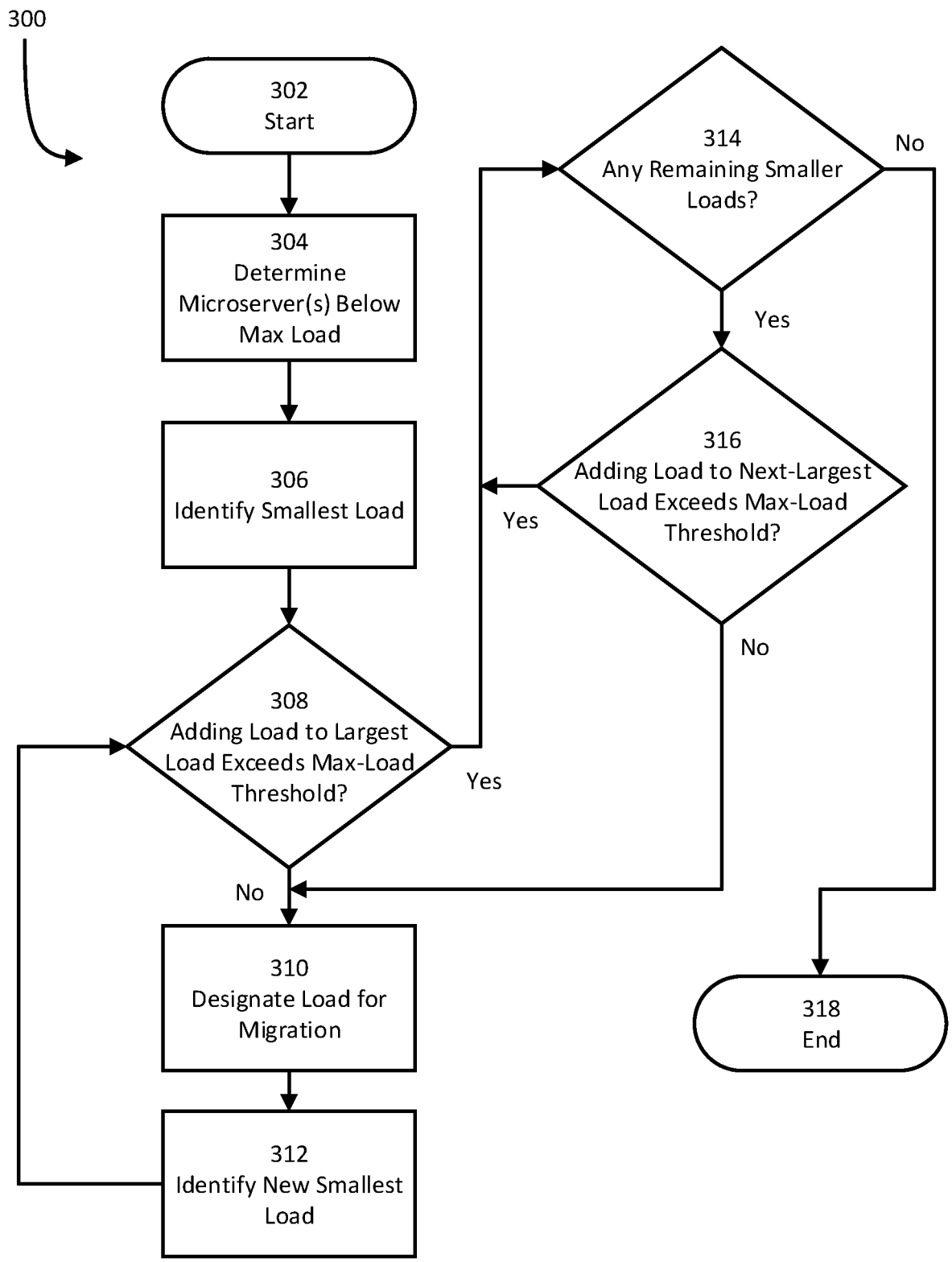
FIG. 3 illustrates a process of identifying microserver loads for migration according to an example.

FIG. 3 illustrates a process 300 executed by the controller 102 to identify microserver loads of the microservers 104 to migrate according to an example. For example, the process 300 may illustrate an example of act 208 of the process 200.

At act 302, the process 300 begins.

At act 304, the controller 102 identifies microservers operating below a maximum-application-load threshold. Each of the microservers 104 may have a maximum-application-load threshold beyond which the respective microserver should not normally execute additional applications. For example, a maximum-application-load threshold may be expressed in Watts (W) or computational cycles. Accordingly, act 304 includes identifying a current application-load on each of the microservers 104 and identifying microservers for which a current application load is below a respective application-load threshold of the respective microserver.

At act 306, a smallest application load is identified from the microservers operating below the maximum-application-load threshold. For example, the smallest application load may correspond to a microserver consuming a smallest amount of electrical power of the microservers 104. The controller 102 may identify a microserver having a smallest application load based on the application data and historical application-load data, based on direct measurements of application-load data, a combination of both, and so forth.

At act 308, a determination is made as to whether adding the application load managed by the microserver managing the smallest application load to an application load managed by a microserver managing a largest application load exceeds an application-load threshold of the microserver managing the largest application load. For example, the controller 102 may determine if migrating an application load from the microserver managing the smallest application load to the microserver managing the largest application load would exceed the latter microserver's application-load threshold at an instantaneous moment, or within a threshold range of times based on the historical application-load data, such as within the next five minutes, the next hour, the next day, and so forth. If migrating the application load would not exceed the application-load threshold (308 NO), then the process 300 continues to act 310.

At act 310, applications of the originating microserver (for example, the microserver managing the smallest application load) are designated for migration to the destination microserver (for example, the microserver managing the largest application load). Where the process 300 is an example of act 208 of the process 200, for example, the applications may later be migrated at act 210. The controller 102 may re-calculate the application load of the destination microserver to include the application load of the originating microserver, even if the application load has not actually been migrated yet, and the application load of the originating microserver is removed from the list of microserver loads. For example, if an originating microserver has an application load of 1 W and the destination microserver has an application load of 2 W, act 310 may include re-calculating the application load of the destination microserver to be 3 W even if the migration is not executed until after the process 300 terminates, and the application load of the originating microserver is removed from consideration.

At act 312, a new smallest application load is identified from the microservers operating below the maximum-application-load threshold. As discussed above, at act 310 the list of microserver loads is re-calculated to account for the designated migration of the smallest application load identified at act 306, and the re-calculating list consequently has a new smallest application load. The process 300 then continues to act 308, with a load under consideration being the new smallest application load.

Returning to act 308, if adding a load under consideration (for example, a smallest application load if continuing to act 308 from act 306, or a new smallest application load if continuing to act 308 from act 312) to a largest application load would exceed an application-load threshold (308 YES) of a destination microserver, then the process 300 continues to act 314.

At act 314, a determination is made as to whether any microserver managing smaller application loads remain to be considered as destination microservers. For example, a determination may be made as to whether there is a microserver managing an application load smaller than the largest application load but greater than the load under consideration. If no smaller application loads remain (314 NO), then the process 300 ends at act 318, because it is no longer possible to migrate application loads without exceeding the application-load threshold of a destination microserver. That is, if it is not possible to add the smallest application load to any other microserver without exceeding the application-load threshold of a destination microserver, then the application loads may have been consolidated amongst the microservers 104 as much as possible or desired. However, if smaller application loads do remain (314 YES), then further consolidation may be possible and the process 300 continues to act 316.

At act 316, a determination is made as to whether adding an application load under consideration to a next-largest load exceeds the application-load threshold of the destination microserver. If so (316 YES), then the application load under consideration cannot be migrated to the destination microserver and the process 300 returns to act 314 to determine if any smaller application loads remain. Otherwise, if adding the application load under consideration to the next-largest application load does not exceed the maximum-application-load threshold (316 NO), then the process 300 continues to act 310. As discussed above, at act 310, the application load under consideration is identified for migration to the destination microserver managing the next-largest application load. The process 300 then continues to act 312, and acts 308-316 are repeated until it is no longer possible to further consolidate any application loads (314 NO), and the process 300 ends at act 318.

An example is provided with respect to the microservers 104 for purposes of explanation, in which the first microserver 104a executes the one or more applications 112 and has an application load of 2 W. The second microserver 104b executes one or more applications and has an application load of 3 W. The third microserver 104c executes one or more applications and has an application load of 5 W. Each of the microservers 104 has a maximum-application-load threshold of 6 W.

At act 304, a determination is made that each of the microservers 104 is operating below the maximum-application-load threshold of 6 W, because none of the microservers 104 has an application load in excess of 6 W.

At act 306, the first microserver 104a is identified as having the smallest application load, because its application load of 2 W is smaller than those of the second and third microservers 104b, 104c.

At act 308, a determination is made that adding the smallest application load of the microservers 104—that is, the 2 W application load of the first microserver 104a—to the largest application load of the microservers 104—that is, the 5 W application load of the third microserver 104c—would exceed the maximum-application-load threshold of 6 W of the third microserver 104c (308 YES), because the 7 W sum of the smallest and largest application loads is greater than 6 W. The application load of the first microserver 104a is not migrated to the third microserver 104c because doing so would exceed the application-load threshold of the third microserver 104c. The process 300 continues to act 314.

At act 314, a determination is made that there is a remaining application load, the 3 W application load of the second microserver 104b, that is smaller than the application load of the third microserver 104c but larger than the application load of the first microserver 104a (314 YES). Accordingly, the process 300 continues to act 316.

At act 316, a determination is made that adding the application load of the first microserver 104a to the application load of the second microserver 104b would not exceed the maximum-application-load threshold of the second microserver 104b (316 NO), because the 5 W sum of the application loads is less than 6 W. Accordingly, the process 300 continues to act 310.

At act 310, the application load of the first microserver 104a is designated for migration to the second microserver 104b. Accordingly, the application load of the second microserver 104b is considered to be the aggregate application load of 5 W for future determinations, even if the application load of the first microserver 104a has not yet been migrated to the second microserver 104b. The remaining application loads of the microserver system 100 are thus the 5 W application load of the second microserver 104b and the 5 W application load of the third microserver 104c.

At act 312, a next-smallest application load is identified as the 5 W application load of both the second microserver 104b and the third microserver 104c.

Returning to act 308, a determination is made that adding the smallest application load of 5 W to the largest application load of 5 W yields a 10 W application load, which exceeds the application-load threshold of 6 W (308 YES).

At act 314, a determination is made that no remaining smaller loads exist (314 NO), because in this example, there are no other application loads remaining. Because no further application-load consolidation is possible, the process 300 ends at act 318.

In this example, the application loads of the micro servers 104 may be consolidated to the second microserver 104b and the third microserver 104c by migrating the application load of the first microserver 104a to the second microserver 104b. Accordingly, the first microserver 104a may be controlled to enter a lower-power mode after the one or more applications 112 are migrated from the first microserver 104a to the second microserver 104b. Power efficiency of the microserver system 100 may thus be increased by reducing a number of the microservers 104 executing applications.

As discussed above, the process 200 may be executed repeatedly, continuously, or in response to an event (for example, in response to an application load of the microserver system 100 changing). For example, the process 200 may be executed repeatedly at regular or irregular intervals to determine whether it is possible to consolidate application loads amongst fewer microservers to provide increases in power efficiency. In some examples, the consolidation may be based on predictions of future application loads. For example, in determining whether combining two application loads at acts 308 and 316 exceeds an application-load threshold, the controller 102 may predict a future application load of an originating microserver and a destination microserver based on historical application-load data stored in the storage and/or memory 110. The controller 102 may pick an interval of time, such as an hour, extending from a current time, and predict an application load over time based on the application data and historical application-load data for both the originating and destination microservers. If the aggregate application load is predicted to exceed the application-load threshold at any time or for a threshold amount of time in the interval of time, then a determination may be made to not migrate the application load. The controller 102 may base a prediction the application load at least in part on the application-load data 114 optionally determined at act 204 in some examples.

As discussed above, the controller 102 may execute the processes 200, 300, which may include executing the load balancer 108. Executing the processes 200, 300 using the controller 102 and the load balancer 108 may be advantageous because the load balancer 108 may be a pre-existing function of the controller 102, and may be capable of obtaining and interpreting data and/or information from the microservers 104 quickly and easily to determine application loads and application-load data, and may be capable of performing application instantiation, migration, and deactivation. That is, the load balancer 108 already has the access privileges necessary to perform application instantiation, migration, and deactivation, and may have permission to directly access the storage and/or memory 110 and to poll the microservers 104 for data and/or information. This may be more efficient than, for example, requesting data and/or information from another device controlling access to the storage and/or memory 110 or microservers 104, or requesting that another device perform instantiation, migration, and/or deactivation. In other examples, however, the processes 200, 300 may be executed by other components or devices, which may be remote from the common hardware bus 106 and which may or may not include a load balancer, provided that a flow of application data to appropriate microservers can still be controlled. Furthermore, although the examples provided herein are provided with respect to microservers and may be especially advantageous in connection with microservers, the examples provided herein may also be applicable with respect to servers that are not microservers.

Although in some examples application loads may be consolidated provided that an aggregate application load is below an application-load threshold, in other examples, additional requirements may need to be satisfied prior to consolidating application loads. For example, an aggregate application load may need to be below an application-load threshold by a certain amount for migration to occur. Introducing such a guard-band around the application-load threshold may be beneficial by allowing the application load of the destination microserver to fluctuate somewhat without requiring applications to be migrated from the destination microserver shortly after the original migration is executed as a result of the application load fluctuating above the application-load threshold.

Furthermore, in some examples, certain microservers may only be eligible to execute certain types of applications. For example, a certain microserver may exclusively execute applications provided by client devices in a hospital setting. Accordingly, even if a destination microserver has enough capacity to host additional applications, the destination microserver may not be an eligible destination microserver unless the applications from an originating microserver are an appropriate type of application. In some examples, a migration priority may be determined based on an application type. A microserver may be selected as a destination microserver for all applications of a designated type, provided that the microserver is capable of handling the application load. For example, a microserver may be selected as a destination microserver for all applications of a designated type or types even if another eligible destination microserver has a heavier application load. Similarly, an originating microserver may be restricted to migrating only certain types of applications, migrating applications in a certain order based on application type, or migrating applications to certain destination microservers based on application type.

Certain microservers or microserver applications may be subject to certain migration restrictions. For example, a microserver or application may be tagged with migration restrictions that forbid migration, or allow migration only under limited circumstances. Such circumstances may include, for example, only allowing migration during certain times, only allowing migration below a certain application load, restricting migration based on an application type or an identity of an originating or destination microserver, and so forth. Such restrictions may be specified by a user or a manufacturer, or may be determined by a computing device, such as the controller 102, and may change over time.

As discussed above, application load may be expressed in terms of one or more parameters including CPU usage, memory, storage, network bandwidth, disk utilization, disk bandwidth, electrical power consumption, computational load (for example, expressed in computational cycles) and so forth, which may be measured directly or calculated based on other parameters. For example, a CPU usage of a microserver may be measured or polled directly from the microserver, and an electrical power consumption may be calculated based on the CPU usage. In another example, an electrical power consumption of the microserver could be measured directly, or determined based on other electrical parameter measurements, such as a current and/or voltage consumption of the microserver.

In some examples, the controller 102 may only execute the processes 200, 300 after a certain threshold period of time has elapsed. For example, when the controller 102 is initially connected to the common hardware bus 106, the controller 102 may collect application-load data and store the data in the storage and/or memory 110 for a certain amount of time before executing the processes 200, 300. This calibration period may enable the controller 102 to collect enough data to determine an application load based on application data prior to executing the processes 200, 300. Similarly, if a new microserver is connected to the common hardware bus 106 or a new application or set of applications is provided to the microserver system 100, the controller 102 may refrain from executing the processes 200, 300 with respect to the new microserver or new application(s) for a threshold period of time after the new microserver or application(s) are connected or instantiated.

Although the foregoing examples refer to a threshold period of time, such calibration periods may alternately or additionally be based on a certain amount of data being collected, rather than or in addition to a certain amount of time elapsing.

As discussed above with respect to act 310, if a determination is made that two application loads may be combined without exceeding an application-load threshold of a destination microserver, then the controller 102 may designate the application load of the originating microserver for migration to the destination microserver. In some examples, the originating microserver may be a microserver having a smaller application load and the destination microserver may be a microserver having a larger application load. In other examples, the originating microserver may be a microserver having a larger application load and the destination microserver may be a microserver having a smaller application load. Furthermore, while in some examples some or all of the microservers may have identical application-load thresholds, in other examples, some or all of the microservers may have differing application-load thresholds. In such examples, microservers having larger application-load thresholds may or may not be preferred as destination microservers, as opposed to originating microservers.

As discussed above with respect to act 212, unused microservers may be controlled to enter a lower-power mode of operation. The lower-power mode of operation may include a partially or completed powered down mode of operation. Accordingly, while a microserver may consume a lesser amount of power in the lower-power mode of operation than in the active or idle mode of operation, the microserver may or may not still be consuming some power.

Furthermore, in some examples, act 212 may be optionally executed. For example, some or all of the unused microservers may be maintained in the idle mode of operation. In some examples, a power efficiency of the microserver system 100 may be increased by minimizing a number of the microservers 104 in the active mode of operation, even if some or all of the others of the microservers 104 are maintained in the idle mode of operation.

Various controllers, such as the controller 102, may execute various operations discussed above. Using data stored in associated memory and/or storage, such as the storage and/or memory 110, the controller 102 also executes one or more instructions stored on one or more non-transitory computer-readable media that may result in manipulated data. In some examples, the controller 102 may include one or more processors or other types of controllers. In one example, the controller 102 is or includes a commercially available, general-purpose processor. In another example, the controller 102 performs at least a portion of the operations discussed above using an application-specific integrated circuit tailored to perform particular operations in addition to, or in lieu of, a general-purpose processor. As illustrated by these examples, examples in accordance with the present invention may perform the operations described herein using many specific combinations of hardware and software and the invention is not limited to any particular combination of hardware and software components.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A microserver system comprising:
   a plurality of microservers;
   a controller; and
   a common hardware bus physically coupled to and interconnecting the plurality of microservers and the controller, wherein each microserver of the plurality of microservers is configured to execute one or more applications, the controller being configured to:
   identify a first group of microservers of the plurality of microservers and a second group of microservers of the plurality of microservers, the second group of microservers being exempt from migration to the first group of microservers;
   obtain, via the common hardware bus using load-data access privileges granted to the controller as a result of the controller being physically coupled to the common hardware bus, application-load data associated with the first group of microservers, the application-load data including at least one of current application-load data or historical application-load data and being associated with application data generated by the first group of microservers as a result of executing applications of the one or more applications based on input data received from one or more devices connected to the common hardware bus;
   determine, based on the application-load data associated with the one or more applications, a first application load of a first set of one or more applications executed by a first microserver with a smallest application load of the first group of microservers and a second application load of a second set of one or more applications executed by a second microserver of the first group of microservers;
   determine that a combination of the first application load and the second application load is below a maximum-application-load threshold of the second microserver; and
   migrate, via the common hardware bus using migration privileges granted to the controller as a result of the controller being physically coupled to the common hardware bus, the first set of one or more applications from the first microserver to the second microserver, wherein migrating the first set of one or more applications from the first microserver to the second microserver includes the controller
   communicating with the second microserver via the common hardware bus to instantiate the first set of one or more applications on the second microserver,
   routing the application data associated with the first set of one more applications to the second microserver via the common hardware bus,
   communicating with the first microserver via the common hardware bus to deactivate the first set of one or more applications on the first microserver, and
   routing subsequently received input data received from the one or more devices and associated with the first set of one or more applications to the second microserver.

2. The microserver system of claim 1, wherein migrating the first set of one or more applications from the first microserver to the second microserver includes:
   the controller accessing first data associated with the first microserver through a direct connection to the first microserver via the common hardware bus, and accessing second data associated with the second microserver through a direct connection to the second microserver via the common hardware bus.

3. The microserver system of claim 1, wherein the controller is further configured to control the first microserver to enter a low-power mode subsequent to migrating the first set of one or more applications from the first microserver to the second microserver.

4. The microserver system of claim 1, wherein the controller is further configured to:
identify a third application load of a third set of one or more applications executed by a third microserver of the first group of microservers, the third application load being a next-smallest application load after the first application load; and
identify a fourth application load of a fourth set of one or more applications executed by a fourth microserver of the first group of microservers, the fourth application load being a largest application load of the first group of microservers.

5. The microserver system of claim 4, wherein the controller is further configured to:
determine that a combination of the third application load and the fourth application load is above a maximum-application-load threshold of the fourth microserver;
identify a fifth application load of a fifth set of one or more applications executed by a fifth microserver of the first group of microservers, the fifth application load being a next-largest application load of the first group of microservers after the fourth application load;
determine that a combination of the third application load and the fifth application load is below a maximum-application-load threshold of the fifth microserver; and
migrate the third set of one or more applications from the third microserver to the fifth microserver.

6. The microserver system of claim 4, wherein the controller is further configured to:
determine that a combination of the third application load and the fourth application load is below a maximum-application-load threshold of the fourth microserver; and
migrate the third set of one or more applications from the third microserver to the fourth microserver.

7. The microserver system of claim 6, wherein the fourth microserver is the second microserver and wherein the fourth set of one or more applications includes the first set of one or more applications and the second set of one or more applications.

8. The microserver system of claim 1, wherein the controller is further configured to repeatedly determine whether any combination of application loads from two or more microservers of the first group of microservers is below a maximum-application-load threshold of any of the two or more microservers, and to migrate applications to a microserver of the two or more microservers for which a combination of application loads is below the maximum-application-load threshold of the microserver.

9. The microserver system of claim 1, wherein the common hardware bus is a backplane.

10. The microserver system of claim 1, wherein determining the first application load of the first microserver is based on at least one of the historical application-load data for the first set of one or more applications stored by the controller or the current application-load data determined by the controller for the first set of one or more applications.

11. The microserver system of claim 1, further comprising a storage and/or memory directly coupled to the common hardware bus, and wherein obtaining the application-load data includes at least one of:
polling at least one microserver of the first group of microservers, or
retrieving the application-load data from the storage and/or memory.

12. A non-transitory computer-readable medium storing thereon sequences of computer-executable instructions for managing a plurality of microservers, the sequences of computer-executable instructions including instructions that instruct at least one processor, the at least one processor coupled to a common hardware bus, the common hardware bus physically interconnecting the at least one processor and the plurality of microservers, and having load-data access privileges granted to the at least one processor as a result of the at least one processor being physically coupled to the common hardware bus, to:
identify a first group of microservers of the plurality of microservers and a second group of microservers of the plurality of microservers, the second group of microservers being exempt from migration to the first group of microservers;
obtain, via the common hardware bus using the load-data access privileges granted to the at least one processor as a result of the at least one processor being physically coupled to the common hardware bus, application-load data associated with the first group of microservers, the application-load data including at least one of current application-load data or historical application-load data and being associated with application data generated by the first group of microservers as a result of executing applications of one or more applications based on input data received from one or more devices connected to the common hardware bus;
determine, based on the application-load data associated with the one or more applications executed by the first group of microservers, a first application load of a first set of one or more applications executed by a first microserver with a smallest application load of the first group of microservers and a second application load of a second set of one or more applications executed by a second microserver of the first group of microservers;
determine that a combination of the first application load and the second application load is below a maximum-application-load threshold of the second microserver; and
migrate, via the common hardware bus using migration privileges granted to the at least one processor as a result of the at least one processor being physically coupled to the common hardware bus, the first set of one or more applications from the first microserver to the second microserver, wherein migrating the first set of one or more applications from the first microserver to the second microserver includes the at least one processor
communicating with the second microserver via the common hardware bus to instantiate the first set of one or more applications on the second microserver via the common hardware bus,
routing the application data associated with the first set of one or more applications to the second microserver via the common hardware bus,
communicating with the first microserver via the common hardware bus to deactivate the first set of one or more applications on the first microserver, and routing subsequently received input data received from the one or more devices and associated with the first set of one or more applications to the second microserver.

13. The non-transitory computer-readable medium of claim 12, wherein migrating the first set of one or more applications from the first microserver to the second microserver includes:
the controller accessing first data associated with the first microserver through a direct connection to the first microserver via the common hardware bus, and accessing second data associated with the second microserver through a direct connection to the second microserver via the common hardware bus.

14. The non-transitory computer-readable medium of claim 12, wherein the instructions further instruct the at least one processor to control the first microserver to enter a low-power mode subsequent to migrating the first set of one or more applications from the first microserver to the second microserver.

15. The non-transitory computer-readable medium of claim 12, wherein the instructions further instruct the at least one processor to:
identify a third application load of a third set of one or more applications executed by a third microserver of the first group of microservers, the third application load being a next-smallest application load after the first application load; and
identify a fourth application load of a fourth set of one or more applications executed by a fourth microserver of the first group of microservers, the fourth application load being a largest application load of the first group of microservers.

16. The non-transitory computer-readable medium of claim 15, wherein the instructions further instruct the at least one processor to:
determine that a combination of the third application load and the fourth application load is above a maximum-application-load threshold of the fourth microserver;
identify a fifth application load of a fifth set of one or more applications executed by a fifth microserver of the first group of microservers, the fifth application load being a next-largest application load of the first group of microservers after the fourth application load;
determine that a combination of the third application load and the fifth application load is below a maximum-application-load threshold of the fifth microserver; and
migrate the third set of one or more applications from the third microserver to the fifth microserver.

17. The non-transitory computer-readable medium of claim 15, wherein the instructions further instruct the at least one processor to:
determine that a combination of the third application load and the fourth application load is below a maximum-application-load threshold of the fourth microserver; and
migrate the third set of one or more applications from the third microserver to the fourth microserver.

18. The non-transitory computer-readable medium of claim 17, wherein the fourth microserver is the second microserver and wherein the fourth set of one or more applications includes the first set of one or more applications and the second set of one or more applications.

19. The non-transitory computer-readable medium of claim 12, wherein the instructions further instruct the at least one processor to repeatedly determine whether any combination of application loads from two or more microservers of the first group of microservers is below a maximum-application-load threshold of any of the two or more microservers, and to migrate applications to a microserver of the two or more microservers for which a combination of application loads is below the maximum-application-load threshold of the microserver.

20. The non-transitory computer-readable medium of claim 12, wherein determining the first application load includes at least one of accessing the historical application-load data for the first set of one or more applications or determining the current application-load data for the first set of one or more applications.

21. A method of managing a plurality of microservers, the method comprising:
identifying a first group of microservers of the plurality of microservers and a second group of microservers of the plurality of microservers, the second group of microservers being exempt from migration to the first group of microservers;
obtain, via a common hardware bus physically interconnecting the plurality of microservers using load-data access privileges granted to devices coupled to the common hardware bus, application-load data associated with the first group of microservers, the application-load data including at least one of current application-load data or historical application-load data and being associated with application data generated by the first group of microservers as a result of executing applications of one or more applications based on input data received from one or more devices connected to the common hardware bus;
determining, based on the application-load data associated with the one or more applications executed by the first group of microservers, a first application load of a first set of one or more applications executed by a first microserver with a smallest application load of the first group of microservers and a second application load of a second set of one or more applications executed by a second microserver of the first group of microservers;
determining that a combination of the first application load and the second application load is below a maximum-application-load threshold of the second microserver; and
migrating, via the common hardware bus using migration privileges granted to devices physically coupled to the common hardware bus, the first set of one or more applications from the first microserver to the second microserver, wherein migrating the first set of one or more applications from the first microserver to the second microserver includes
communicating with the second microserver via the common hardware bus to instantiate the first set of one or more applications on the second microserver via the common hardware bus,
routing application data associated with the first set of one or more applications to the second microserver via the common hardware bus,
communicating with the first microserver via the common bus to deactivate the first set of one or more applications on the first microserver, and
routing subsequently received input data, from the one or more devices, associated with the first set of one or more applications to the second microserver.

* * * * *